(12) United States Patent
Hsu et al.

(10) Patent No.: US 11,515,791 B2
(45) Date of Patent: Nov. 29, 2022

(54) TRANSIENT RESPONSE IMPROVING SYSTEM AND METHOD WITH PREDICTION MECHANISM OF ERROR AMPLIFIED SIGNAL

(71) Applicant: ANPEC ELECTRONICS CORPORATION, Hsinchu (TW)

(72) Inventors: Chun-Kai Hsu, Hsinchu (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 36 days.

(21) Appl. No.: 17/363,007

(22) Filed: Jun. 30, 2021

(65) Prior Publication Data

US 2022/0271666 A1    Aug. 25, 2022

(30) Foreign Application Priority Data

Feb. 25, 2021   (TW) .................................. 110106728

(51) Int. Cl.
  *H02M 3/158*  (2006.01)
  *H02M 1/32*   (2007.01)
  *H02M 1/00*   (2006.01)

(52) U.S. Cl.
  CPC ....... *H02M 3/1582* (2013.01); *H02M 1/0009* (2021.05); *H02M 1/32* (2013.01)

(58) Field of Classification Search
  CPC ..... H02M 3/1582; H02M 1/0009; H02M 1/32
  See application file for complete search history.

(56) References Cited

U.S. PATENT DOCUMENTS

| | | | |
|---|---|---|---|
| 7,609,040 B1* | 10/2009 | Jain ..................... | H02M 3/1584 323/283 |
| 9,639,102 B2* | 5/2017 | Dally ..................... | G05F 1/563 |
| 2010/0270989 A1* | 10/2010 | Sasaki ................. | H02M 3/1588 323/282 |
| 2011/0169468 A1* | 7/2011 | Wu ........................ | H02M 3/157 323/282 |
| 2018/0351450 A1* | 12/2018 | Pelicia .................... | G05F 1/462 |
| 2019/0293695 A1* | 9/2019 | Guthrie .............. | G01R 19/0038 |
| 2020/0403525 A1* | 12/2020 | Miyazaki .............. | H02M 1/083 |

* cited by examiner

*Primary Examiner* — Rafael O De Leon Domenech
(74) *Attorney, Agent, or Firm* — Li & Cai Intellectual Property Office

(57) ABSTRACT

A transient response improving system and method with a prediction mechanism of an error amplified signal are provided. A current sensor circuit senses a current flowing through a first resistor connected between an adapter and an electronic device. When the current is larger than a current threshold, a predicting circuit calculates a target voltage level based on a common voltage and a voltage of the battery and instantly pulls up or down a voltage level of the error amplified signal to the target voltage level. A comparator compares the error amplified signal with a ramp signal to output a comparison signal. A controller circuit controls a driver circuit to switch a high-side switch and a low-side switch according to the comparison signal.

9 Claims, 7 Drawing Sheets

TRANSIENT RESPONSE IMPROVING SYSTEM AND METHOD WITH PREDICTION MECHANISM OF ERROR AMPLIFIED SIGNAL

CROSS-REFERENCE TO RELATED PATENT APPLICATION

This application claims the benefit of priority to Taiwan Patent Application No. 110106728, filed on Feb. 25, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a switching charger, and more particularly to a transient response improving system and method with a prediction mechanism of an error amplified signal.

BACKGROUND OF THE DISCLOSURE

In recent years, with the continuous advancement of technology, various electronic products with different functions have gradually been developed to satisfy different requirements. Such electronic products have become an indispensable part of people's daily lives and make people's lives more convenient. The electronic product may include a plurality of electronic components to which different power voltages need to be supplied. Therefore, a conventional switching charger is used to convert input voltages into different appropriate power voltages and supply the appropriate power voltages respectively to the electronic components such that the electronic product can operate normally. However, switch components of the conventional switching charger cannot be switched quickly. As a result, when a high power voltage is required for the electronic product, the conventional switching charger cannot promptly supply sufficient voltage to the electronic product.

SUMMARY OF THE DISCLOSURE

In response to the above-referenced technical inadequacies, the present disclosure provides a transient response improving system with a prediction mechanism of an error amplified signal, which is applicable to a switching charger. The switching charger includes a high-side switch, a low-side switch, a driver circuit and a controller circuit. The driver circuit is connected to the controller circuit, a control terminal of the high-side switch and a control terminal of the low-side switch. A first terminal of the high-side switch is coupled to a common voltage. The first terminal of the high-side switch is connected to a first terminal of a first resistor and an electronic device. A second terminal of the first resistor is connected to an input power source. The input power source supplies a current to the electronic device through the first resistor. A first terminal of the low-side switch is connected to a second terminal of the high-side switch. A second terminal of the low-side switch is grounded. A node between the second terminal of the high-side switch and the first terminal of the low-side switch is connected to a battery through an inductor. The transient response improving system with the prediction mechanism of the error amplified signal includes a current sensor circuit, a predicting circuit and a comparator. The current sensor circuit is connected to the first resistor. The current sensor circuit is configured to sense the current flowing through the first resistor. The current sensor circuit is configured to output a boost mode triggering signal when the current sensor circuit determines that the current is larger than a current threshold. The predicting circuit is connected to the current sensor circuit and the battery, and coupled to the common voltage. When the predicting circuit receives the boost mode triggering signal, the predicting circuit determines that the switching charger needs to enter a turbo boost mode from a buck mode, calculates a target voltage level based on the common voltage and a voltage of the battery, and instantly pulls up or down a voltage level of the error amplified signal to the target voltage level. A first input terminal of the comparator is connected to a ramp signal generator. A second input terminal of the comparator is connected to an output terminal of the predicting circuit. The comparator is configured to receive a ramp signal from the ramp signal generator and compare the error amplified signal with the ramp signal to output a comparison signal. In the turbo boost mode, the controller circuit controls the driver circuit to drive the high-side switch and the low-side switch according to the comparison signal, such that a current of the battery flows to the electronic device sequentially through the inductor and the high-side switch, and the current of the input power source flows to the electronic device through the first resistor, at the same time.

In certain embodiments, the switching charger further includes a compensation circuit. The compensation circuit is connected between the predicting circuit and the second input terminal of the comparator. The compensation circuit is connected to the first resistor, a second resistor and the battery. The second resistor is connected between the inductor and the battery. The compensation circuit is configured to output the error amplified signal according to voltages or currents of one or more of the first resistor, the second resistor and the battery.

In certain embodiments, the switching charger further includes a feedback circuit. The compensation circuit is connected to the first resistor, the second resistor and the battery through the feedback circuit. The feedback circuit is configured to feedback the voltages or currents of one or more of the first resistor, the second resistor and the battery to the compensation circuit.

In certain embodiments, the predicting circuit includes a level predicting circuit and a level adjusting circuit. The level predicting circuit is coupled to the common voltage. The level predicting circuit is connected to the battery and the level adjusting circuit. The level adjusting circuit is connected to the current sensor circuit and the compensation circuit. The level predicting circuit calculates the target voltage level according to the common voltage and the voltage of the battery. When the level adjusting circuit receives the boost mode triggering signal, the level adjusting circuit instantly pulls up or down the voltage level of the error amplified signal to the target voltage level.

In certain embodiments, the predicting circuit further includes a period calculating circuit. The level predicting circuit is connected to the common voltage and the battery through the period calculating circuit. The period calculating circuit is configured to divide the voltage of the battery by the common voltage to obtain a first value, and then multiply the first value by a period of the ramp signal to calculate an on-time of the high-side switch. The level predicting circuit predicts the target voltage level according to the on-time of the high-side switch.

In certain embodiments, in the buck mode, after the current flows from the input power source to the first resistor, the current is divided into two sub-currents that respectively flow to the electronic device and the battery, or the current flows to one of the electronic device and the battery.

In addition, the present disclosure provides a transient response improving method with a prediction mechanism of an error amplified signal, which is applicable to a switching charger. The switching charger includes a high-side switch, a low-side switch, a driver circuit and a controller circuit. The driver circuit is connected to the controller circuit, a control terminal of the high-side switch and a control terminal of the low-side switch. A first terminal of the high-side switch is coupled to a common voltage. The first terminal of the high-side switch is connected to a first terminal of a first resistor and an electronic device. A second terminal of the first resistor is connected to an input power source. A first terminal of the low-side switch is connected to a second terminal of the high-side switch. A second terminal of the low-side switch is grounded. A node between the second terminal of the high-side switch and the first terminal of the low-side switch is connected to a battery through an inductor. The transient response improving method with the prediction mechanism of the error amplified signal includes the following steps: supplying a current to the electronic device through the first resistor from the input power source; sensing the current flowing through the first resistor; determining whether or not the current is larger than a current threshold, in response to determining that the current is not larger than the current threshold, returning to the previous step, in response to determining that the current is larger than the current threshold, performing the next step; calculating a target voltage level according to the common voltage and a voltage of the battery; pulling up or down a voltage level of the error amplified signal to the target voltage level instantly; comparing the error amplified signal with a ramp signal to output a comparison signal; and using the controller circuit to control the driver circuit to drive the high-side switch and the low-side switch according to the comparison signal, such that a current of the battery flows to the electronic device sequentially through the inductor and the high-side switch, and the current of the input power source flows to the electronic device through the first resistor, at the same time.

In certain embodiments, the transient response improving method with the prediction mechanism of the error amplified signal further includes the following steps: outputting the error amplified signal according to voltages or currents of one or more of the first resistor, the second resistor and the battery, wherein the second resistor is connected between the inductor and the battery; and pulling up or down the voltage level of the error amplified signal to the target voltage level instantly.

In certain embodiments, the transient response improving method with the prediction mechanism of the error amplified signal further includes the following steps: dividing the voltage of the battery by the common voltage to obtain a first value and multiplying the first value by a period of the ramp signal to calculate an on-time of the high-side switch; and predicting the target voltage level according to the on-time of the high-side switch.

As described above, the present disclosure provides the transient response improving system and method with the prediction mechanism of the error amplified signal. The target voltage level is predicted according to the common voltage (that is, the input voltage) of the switching charger and the voltage of the battery (that is, the output voltage of the switching charger). The voltage level of the error amplified signal is instantly pulled up or down to the predicted target voltage level such that the controller circuit is triggered to control the driver circuit to quickly switch the high-side switch and the low-side switch. When the electronic device is operating in the heavy load condition or other conditions and the input power source such as the adapter cannot supply sufficient power to the electronic device, the battery that is used as the backup power source can supply the power to the electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
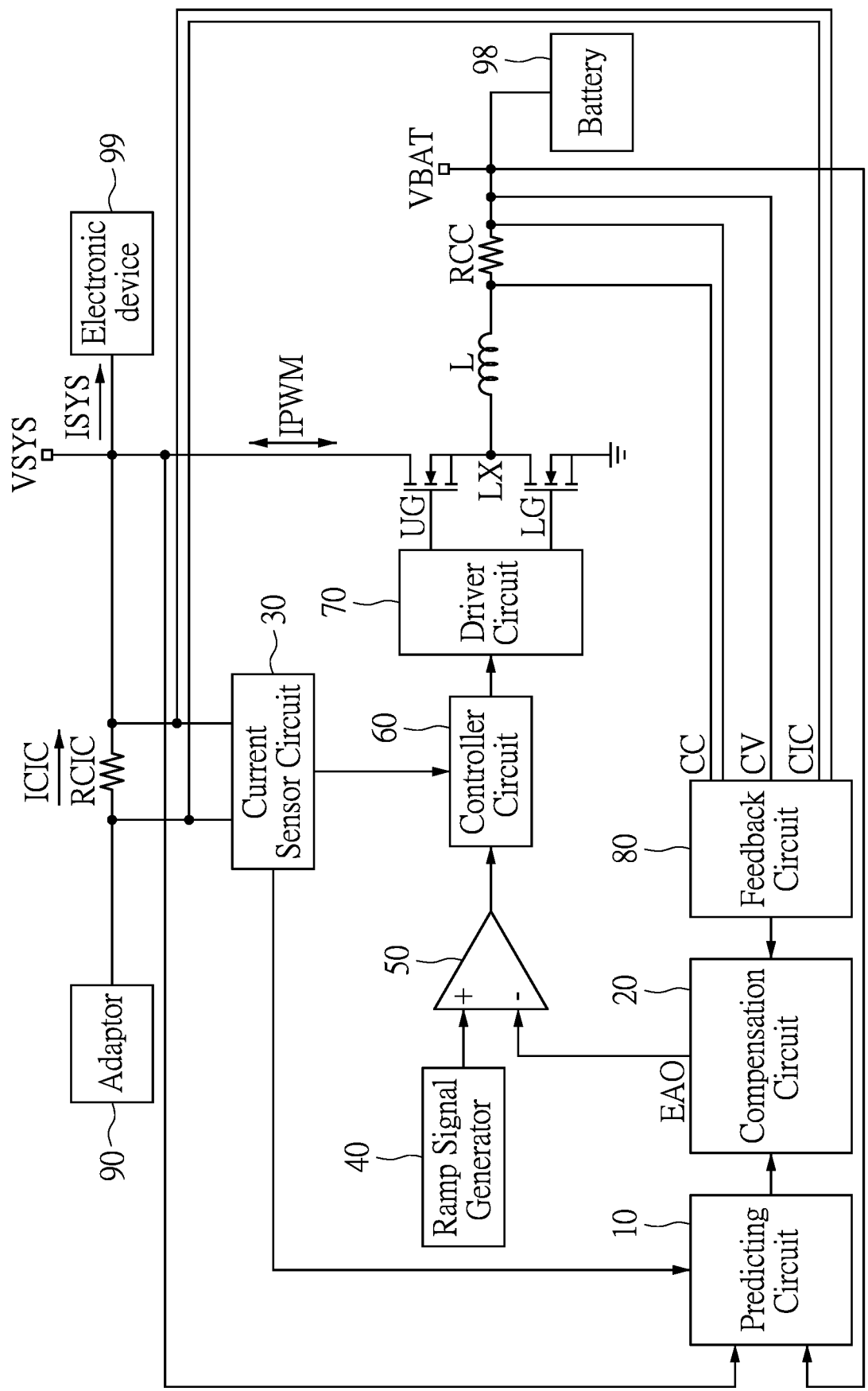
FIG. 1 is a block diagram of a transient response improving system with a prediction mechanism of an error amplified signal according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a transient response improving system with a prediction mechanism of an error amplified signal according to an embodiment of the present disclosure. It should be understood that, circuit components that may be included in the transient response improving system of the present disclosure are shown in FIG. 1, but the present disclosure is not limited thereto. In practice, some of the circuit components may be omitted.

As shown in FIG. 1, in the embodiment, the transient response improving system may include a predicting circuit 10, a current sensor circuit 30 and a comparator 50, which are applicable to a switching charger or called as a power converter. The switching charger may include a high-side switch UG, a low-side switch LG, a driver circuit 70 and a controller circuit 60. Alternatively, any of the circuit components included in the switching charger as described herein may be included in the transient response improving system.

An input terminal of the driver circuit 70 is connected to an output terminal of the controller circuit 60. An output terminal of the driver circuit 70 is connected to a control terminal of the high-side switch UG and a control terminal of the low-side switch LG A first terminal of the high-side switch UG is coupled to a common voltage VSYS and connected to an electronic device 99. A second terminal of the high-side switch UG is connected to a first terminal of the low-side switch LG A second terminal of the low-side switch LG is grounded.

A first terminal of a first resistor RCIC is connected to the first terminal of the high-side switch UG A second terminal of the first resistor RCIC is connected to an input power source such as an adapter 90 or other power supply devices. The second terminal of the first resistor RCIC is connected to the adapter 90. The adapter 90 supplies a current to the electronic device 99 through the first resistor RCIC.

A node LX between the second terminal of the high-side switch UG and the first terminal of the low-side switch LG may be connected to a battery 98 through an inductor L. If necessary, the switching charger may further include a second resistor RCC and a feedback circuit 80. The second resistor RCC may be connected between the inductor L and the battery 98.

The feedback circuit 80 is connected to the first terminal of the first resistor RCIC, the second terminal of the first resistor RCIC, a first terminal of the second resistor RCC, a second terminal of the second resistor RCC, and the battery 98.

If necessary, the switching charger may include a compensation circuit 20. The compensation circuit 20 may be connected to the feedback circuit 80 and a second input terminal such as an inverting input terminal of the comparator 50.

The feedback circuit 80 may be configured to feedback one or more of a current value CIC (or a voltage in practice) of the first resistor RCIC, a current value CC (or a voltage in practice) of the second resistor RCC and a voltage value CV of the battery 98 to the compensation circuit 20.

The compensation circuit 20 may output an error amplified signal EAO to the second input terminal such as the inverting input terminal of the comparator 50, according to one or more of the current value CIC (or the voltage in practice) of the first resistor RCIC, the current value CC (or the voltage in practice) of the second resistor RCC and the voltage value CV of the battery 98. A first input terminal such as a non-inverting input terminal of the comparator 50 is connected to a ramp signal generator circuit 40.

It is worth noting that, the predicting circuit 10 is coupled to the common voltage VSYS, and connected to the current sensor circuit 30 and the battery 98. In other words, the predicting circuit 10 is connected to an output terminal of the switching charger that is the second terminal of the second resistor RCC. In the embodiment, the compensation circuit 20 is disposed in the switching charger, but the present disclosure is not limited thereto. If the compensation circuit 20 is not disposed, the predicting circuit 10 may be directly connected to the second input terminal such as the inverting input terminal of the comparator 50.

Figure 2:
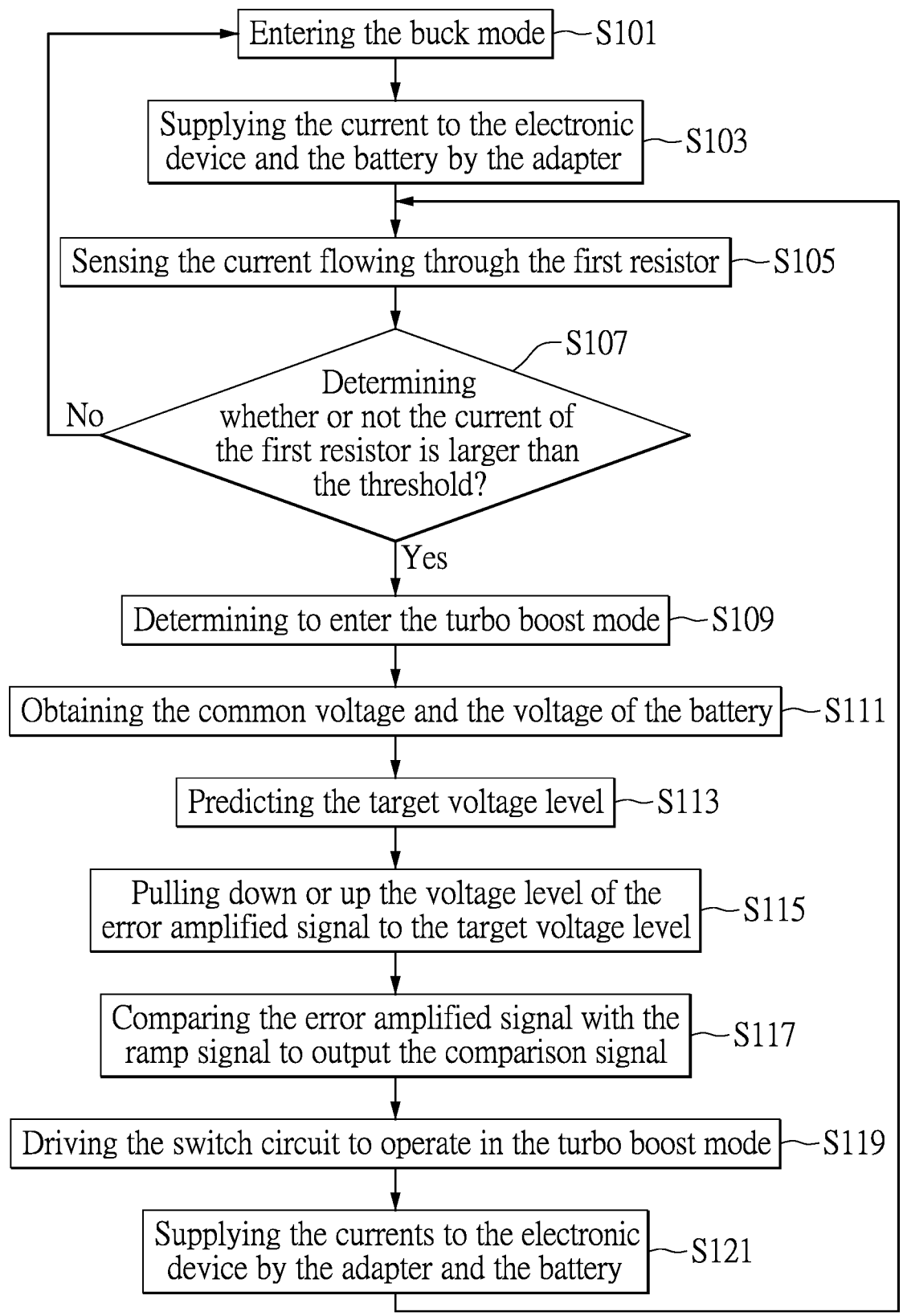
FIG. 2 is a flowchart diagram of a transient response improving method with the prediction mechanism of the error amplified signal according to the embodiment of the present disclosure.

Reference is made to FIGS. 1 and 2, in which FIG. 1 is a block diagram of a transient response improving system with a prediction mechanism of an error amplified signal according to an embodiment of the present disclosure, and FIG. 2 is a flowchart diagram of a transient response improving method with the prediction mechanism of the error amplified signal according to the embodiment of the present disclosure.

In the embodiment, the transient response improving method may include steps S101 to S121 shown in FIG. 2, which may be performed by the transient response improving system shown in FIG. 1 on the switching charger to switch the switching charger between a buck mode and a turbo boost mode.

In step S101, the switching charger enters the buck mode.

In step S103, the power supply device such as the adapter 90 supplies the current to the first resistor RCIC. The first resistor RCIC receives the current from the adapter 90 and generates a current ICIC based on the received current. Then, the current ICIC may be divided into two sub-currents that are a current ISYS and a current IPWM. The current ISYS flows to the electronic device 99 such as a server such that the electronic device 99 obtains power needed for its own operation. The current IPWM flows to the battery 98 to charge the battery 98. In practice, the current ICIC may be only provided to one of the electronic device 99 and the battery 98.

In step S105, the current sensor circuit 30 senses the current ICIC flowing through the first resistor RCIC.

In step S107, the current sensor circuit 30 determines whether or not the current ICIC of the first resistor RCIC is larger than a current threshold. If the current ICIC of the first resistor RCIC is not larger than the current threshold, the current sensor circuit 30 determines that the electronic device 99 may be operating in a light load condition or a medium load condition, and power consumption of the electronic device 99 is low. Under this condition, only one power supply device such as the adaptor 90 needs to supply the current to the electronic device 99.

It is worth noting that, when the electronic device 99 is operating in a heavy load condition, the power consumption of the electronic device 99 increases. Under this condition, the power supply device such as the adaptor 90 needs to supply a larger current to the electronic device 99. At this time, if the current ICIC of the first resistor RCIC that is sensed by the current sensor circuit 30 is larger than the current threshold such as a rated current, the current sensor circuit 30 outputs a boost mode triggering signal, and step S109 is then performed.

In step S109, when the predicting circuit 10 receives the boost mode triggering signal indicating that the current ICIC of the first resistor RCIC is larger than the current threshold, the predicting circuit 10 determines that the switching charger needs to enter the turbo boost mode from the buck mode.

In step S111, the predicting circuit 10 obtains the common voltage VSYS and a voltage VBAT of the battery 98.

In step S113, the predicting circuit 10 calculates a target voltage level of the error amplified signal EAO according to the common voltage VSYS and the voltage VBAT of the battery 98.

In step S115, the predicting circuit 10 outputs the error amplified signal EAO having the target voltage level to the second input terminal such as the inverting input terminal of the comparator 50. If the compensation circuit 20 is disposed in the switching charger, the predicting circuit 10 instantly pulls down or up a voltage level of the error amplified signal EAO outputted by the compensation circuit 20 to the target voltage level.

In step S117, the comparator 50 compares the error amplified signal EAO with a ramp signal RAMP from the ramp signal generator circuit 40 to output a comparison signal to the controller circuit 60.

In step S119, the controller circuit 60 controls the driver circuit 70 to drive the high-side switch UG and the low-side switch LG according to the comparison signal. As a result, in step S121, the current IPWM of the battery 98 that is used as a backup power source flows to the electronic device 99 sequentially through the inductor L and the high-side switch UG, and the current ICIC flows to the electronic device 99, at the same time.

That is, when the electronic device 99 is operating in the heavy load condition, the current of the adaptor 90 may be insufficient to satisfy an electrical power requirement of the electronic device 99. Under this condition, the battery 98 that is used as the backup power source may be discharged to supply power to the electronic device 99. That is, the current ISYS received by the electronic device 99 includes the current IPWM from the battery 98, and the current ICIC that flows through the first resistor RCIC from the adaptor 90. At this time, step S105 may be continually performed. In step S105, the current sensor circuit 30 may continually sense the current ICIC flowing through the first resistor RCIC.

Then, when the electronic device 99 is not operating in the heavy load condition, the power consumption of the electronic device 99 reduces and the current ICIC of the first resistor RCIC decreases to be smaller than the current threshold. Under this condition, the switching charger can be switched to the buck mode from the turbo boost mode. In the buck mode, only the adaptor 90 needs to supply the current ICIC to the electronic device 99, and the battery 98 cannot be discharged. At this time, if necessary, the adaptor 90 may supply the current IPWM to the battery 98 to charge the battery 98.

Figure 3:
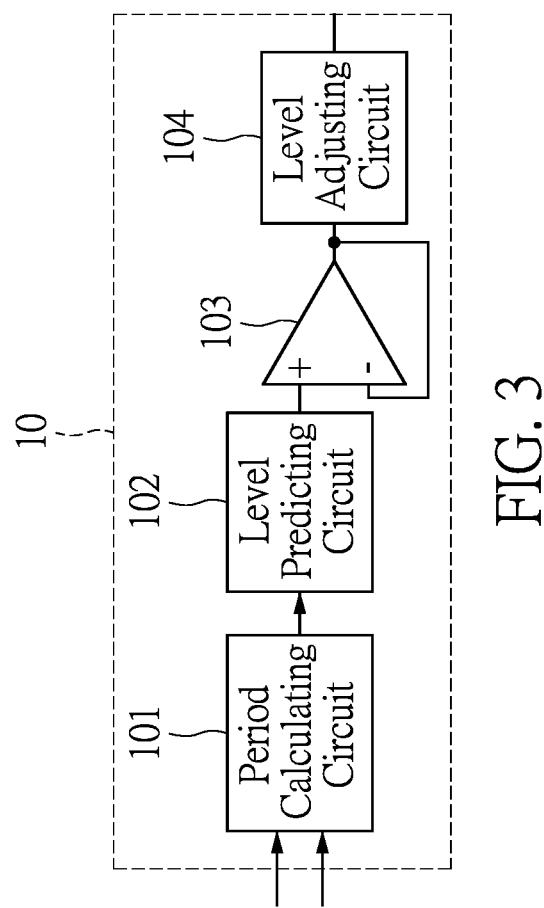
FIG. 3 is a block diagram of a predicting circuit of the transient response improving system with the prediction mechanism of the error amplified signal according to the embodiment of the present disclosure.
Figure 4:
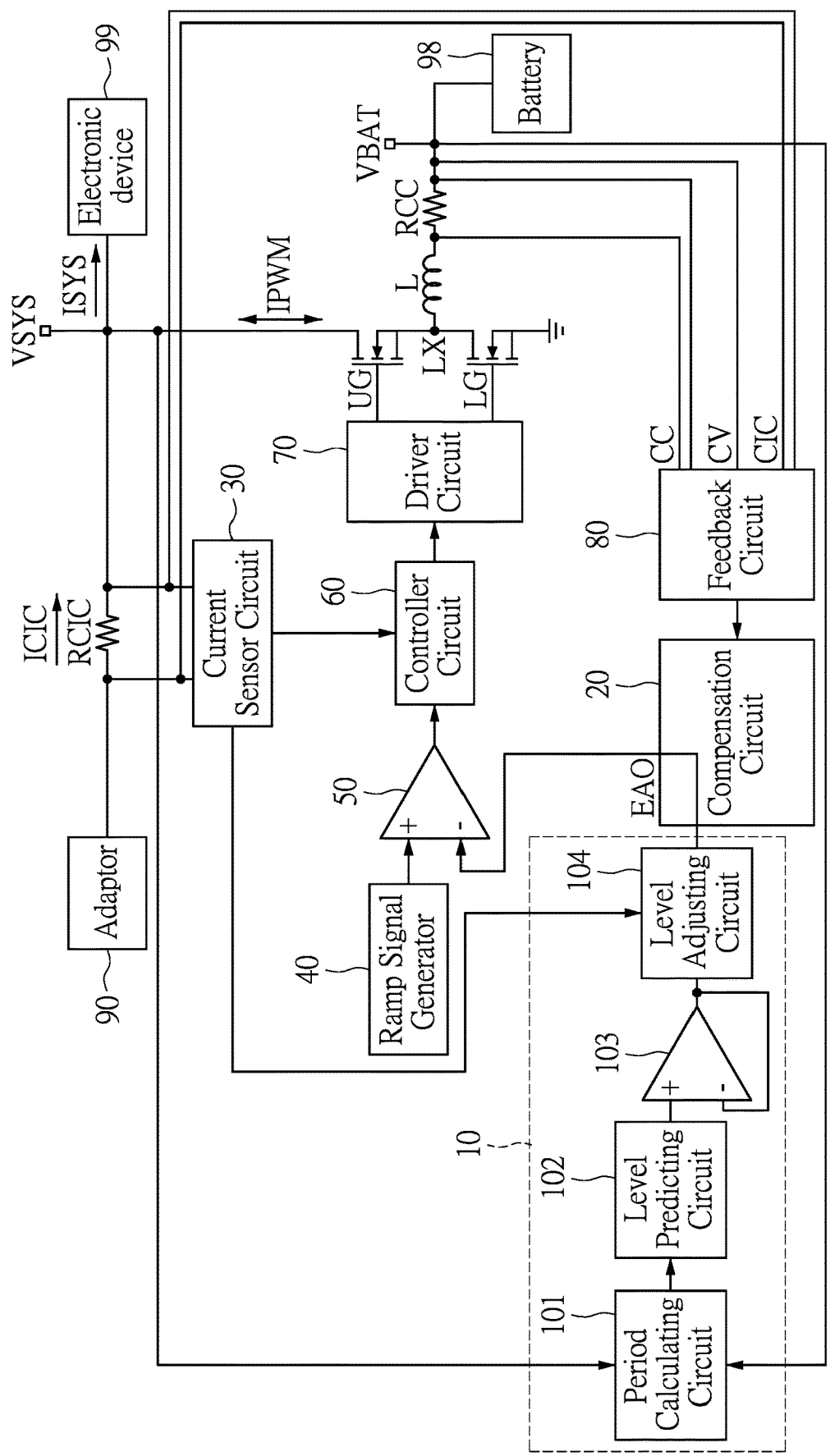
FIG. 4 is another block diagram of the transient response improving system with the prediction mechanism of the error amplified signal according to the embodiment of the present disclosure.
Figure 5:
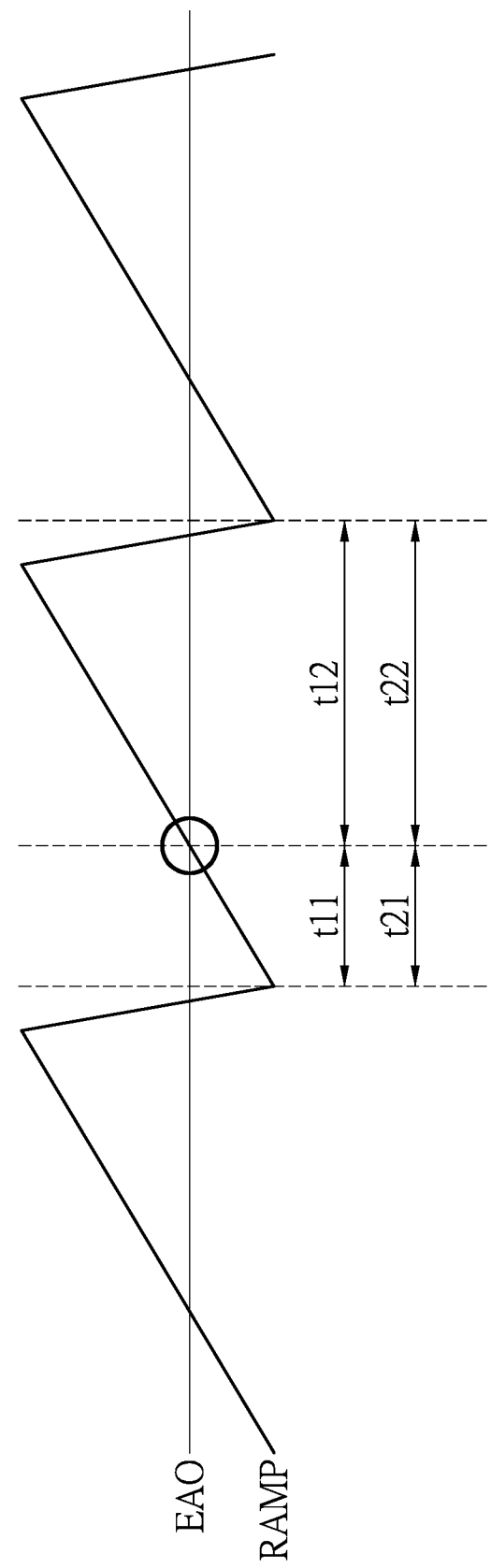
FIG. 5 is a waveform diagram of an error amplified signal and a ramp signal of a switching charger according to the embodiment of the present disclosure.
Figure 6:
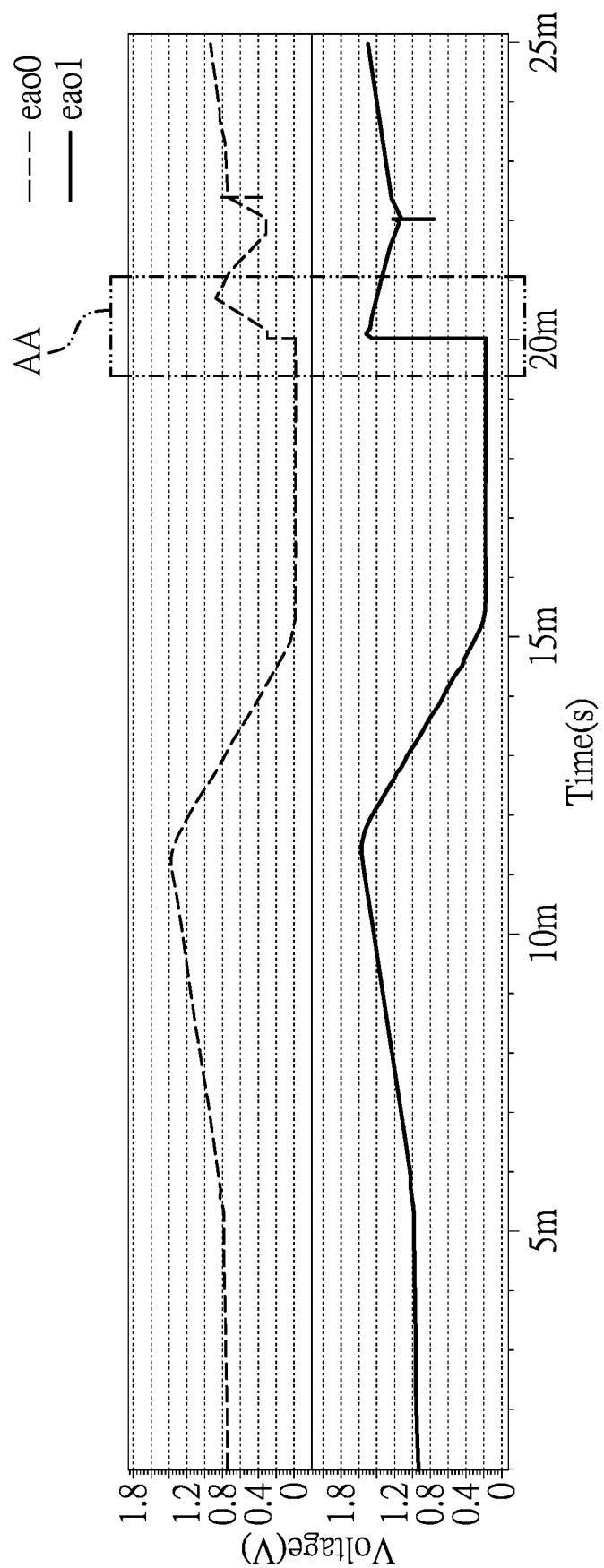
FIG. 6 is a waveform diagram of error amplified signals and ramp signals of the switching charger of the embodiment of the present disclosure and a conventional switching charger.

Reference is made to FIGS. 3 to 6, in which FIG. 3 is a block diagram of a predicting circuit of the transient response improving system with the prediction mechanism of the error amplified signal according to the embodiment of the present disclosure, FIG. 4 is another block diagram of the transient response improving system with the prediction mechanism of the error amplified signal according to the embodiment of the present disclosure, FIG. 5 is a waveform diagram of an error amplified signal and a ramp signal of a switching charger according to the embodiment of the present disclosure, and FIG. 6 is a waveform diagram of error amplified signals and ramp signals of the switching charger of the embodiment of the present disclosure and a conventional switching charger. The same descriptions are not repeated herein.

As shown in FIGS. 3 and 4, the predicting circuit 10 may include a period calculating circuit 101, a level predicting circuit 102, a buffer 103 and a level adjusting circuit 104, but the present disclosure is not limited thereto. In practice, one or more of the buffer 103, the period calculating circuit 101, the level predicting circuit 102 and the level adjusting circuit 104 may be omitted.

An input terminal of the period calculating circuit 101 is coupled to the common voltage VSYS and connected to the battery 98. An input terminal of the level predicting circuit 102 may be connected to an output terminal of the period calculating circuit 101. An output terminal of the level predicting circuit 102 may be connected to a first input terminal such as a non-inverting input terminal of the buffer 103. A second input terminal such as an inverting input terminal of the buffer 103 may be connected to the output terminal of the level predicting circuit 102 and an input terminal of the level adjusting circuit 104.

As shown in FIG. 5, the high-side switch UG is turned on and the low-side switch LG is turned off during a first time t11 of the buck mode and a first time t21 of the turbo boost mode. The high-side switch UG is turned off and the low-side switch LG is turned on during a second time t12 of the buck mode and a second time t22 of the turbo boost mode.

When a voltage of the ramp signal RAMP of the ramp signal generator 40 shown in FIGS. 3 and 4 gradually increases to a voltage of the error amplified signal EAO, the high-side switch UG and the low-side switch LG are switched at a time point circled in FIG. 5. Therefore, an on-time of the high-side switch UG is calculated, and then the time point at which the high-side switch UG and the low-side switch LG are switched can be predicted based on the on-time of the high-side switch UG The period calculating circuit 101 may divide the voltage VBAT of the battery 98 by the common voltage VSYS to obtain a first value, and multiply the first value by a period of the ramp signal RAMP to calculate the on-time of the high-side switch UG, which is represented by the following equation:

$$T_{on} = (VBAT/VSYS) \times T_s,$$

wherein Ton represents the on-time of the high-side switch UG in the buck mode, VSYS represents the common voltage that is an input voltage, VBAT represents the voltage of the battery 98 that is an output voltage of the switching charger, and Ts represents the period of the ramp signal RAMP.

In the turbo boost mode, the period calculating circuit 101 may divide the voltage VBAT of the battery 98 by the common voltage VSYS to obtain a first value and multiply the first value by the period of the ramp signal RAMP to calculate the on-time of the high-side switch UG, which is represented by the following equation:

$$Toff=(VBAT/VSYS)\times Ts,$$

wherein Toff represents the on-time of the high-side switch UG in the turbo boost mode, VSYS represents the common voltage that is an output voltage, VBAT represents the voltage of the battery 98 that is an input voltage of the switching charger, and Ts represents the period of the ramp signal RAMP.

If necessary, in the buck mode, the period calculating circuit 101 may calculate an on-time of the low-side switch LG by using the following equation:

$$Ton=((VSYS-VBAT)/VSYS)\times Ts,$$

wherein Ton represents the on-time of the low-side switch LG in the buck mode, VSYS represents the common voltage that is an output voltage, VBAT represents the voltage of the battery 98 that is an input voltage of the switching charger, and Ts represents the period of the ramp signal RAMP.

After the period calculating circuit 101 calculates the on-time of the high-side switch UG, the level predicting circuit 102 may predict the target voltage level according to the on-time of the high-side switch UG and transmit the target voltage level to the level adjusting circuit 104 (through the buffer 103).

When the predicting circuit 10 receives the boost mode triggering signal indicating that the current ICIC of the first resistor RCIC is larger than the current threshold, the level adjusting circuit 104 determines that the switching charger needs to enter the turbo boost mode from the buck mode. At this time, the level adjusting circuit 104 instantly pulls down or up the voltage level of the error amplified signal EAO to the target voltage level as shown in FIG. 6 such that the controller circuit 60 is triggered to control the driver circuit 70 to quickly switch the high-side switch UG and the low-side switch LG The switching charger of the embodiment of the present disclosure generates the error amplified signal EAO shown in FIG. 5 or an error amplified signal eao1 shown in FIG. 6, and each of the error amplified signal EAO and the error amplified signal eao1 is instantly pulled up or down to the target voltage level. In contrast, as shown in FIG. 6, an error amplified signal eao0 generated by the conventional switching charger slowly rises to the target voltage level for a period of times. Therefore, the high-side switch UG and the low-side switch LG of the switching charger of the embodiment of the present disclosure can be switched more quickly. As a result, when the power consumption of the electronic device 99 is large and the adapter 90 cannot supply sufficient power to the electronic device 99, the battery 98 that is used as the backup power source can supply the power to the electronic device 99 through the high-side switch UG being turned on.

Figure 7:
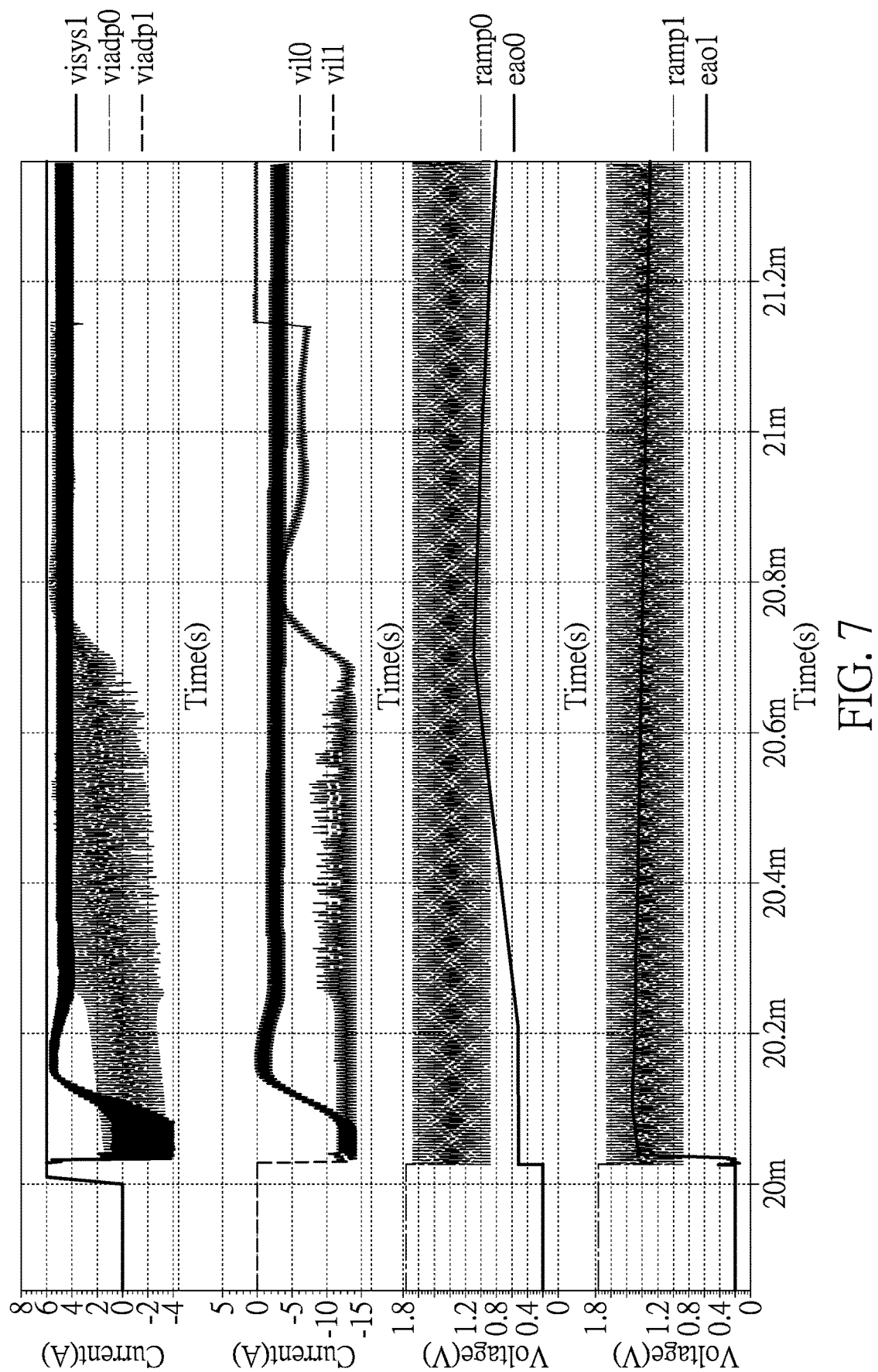
FIG. 7 is a waveform diagram of currents of first resistors, currents of second resistors, error amplified signals and ramp signals of the switching charger of the embodiment of the present disclosure and the conventional switching charger.

Reference is made to FIG. 7, which is a waveform diagram of currents of first resistors, currents of second resistors, error amplified signals and ramp signals of the switching charger of the embodiment of the present disclosure and the conventional switching charger.

In the switching charger of the embodiment of the present disclosure, a current signal viadp1 shown in FIG. 7 flows through the first resistor RCIC shown in FIG. 4, a current signal vil1 shown in FIG. 7 flows through the second resistor RCC shown in FIG. 4, and the error amplified signal eao1 and the ramp signal ramp1 as shown in FIG. 7 are generated, within a time interval indicated by a dash dotted line AA in FIG. 6. In addition, the electronic device 99 to which the switching charger of the embodiment of the present disclosure is applied generates a load current signal visys1 shown in FIG. 7 within the time interval indicated by the dash dotted line AA in FIG. 6.

In the conventional switching charger, a current signal viadp0 shown in FIG. 7 flows through a first resistor, a current signal vil0 shown in FIG. 7 flows through a second resistor, and an error amplified signal eao0 and a ramp signal ramp0 as shown in FIG. 7 are respectively generated by an error amplifier and a ramp signal generator, within the same time interval.

It is worth noting that, the current signal viadp1 of the first resistor RCIC of the switching charger of the present disclosure more quickly rises to the current threshold, in comparison with the current signal viadp0 of the conventional switching charger. In addition, the current signal vil1 of the second resistor RCC of the switching charger of the present disclosure more quickly reaches and maintains at a constant value, in comparison with the current signal vil0 of the conventional switching charger. Therefore, the switching charger of the present disclosure enters the turbo boost mode earlier than the conventional switching charger.

In summary, the present disclosure provides the transient response improving system and method with the prediction mechanism of the error amplified signal. The target voltage level is predicted according to the common voltage (that is, the input voltage) of the switching charger and the voltage of the battery (that is, the output voltage of the switching charger). The voltage level of the error amplified signal is instantly pulled up or down to the predicted target voltage level such that the controller circuit is triggered to control the driver circuit to quickly switch the high-side switch and the low-side switch. When the electronic device is operating in the heavy load condition or other conditions and the input power source such as the adapter cannot supply sufficient power to the electronic device, the battery that is used as the backup power source can supply the power to the electronic device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A transient response improving system with a prediction mechanism of an error amplified signal, which is applicable to a switching charger, wherein the switching charger includes a high-side switch, a low-side switch, a driver circuit and a controller circuit, the driver circuit is connected to the controller circuit, a control terminal of the high-side switch and a control terminal of the low-side switch, a first terminal of the high-side switch is coupled to a common voltage, the first terminal of the high-side switch is connected to a first terminal of a first resistor and an electronic device, a second terminal of the first resistor is connected to an input power source, the input power source supplies a current to the electronic device through the first resistor, a first terminal of the low-side switch is connected to a second terminal of the high-side switch, a second terminal of the low-side switch is grounded, and a node between the second terminal of the high-side switch and the first terminal of the low-side switch is connected to a battery through an inductor, the transient response improving system with the prediction mechanism of the error amplified signal comprising:

- a current sensor circuit connected to the first resistor, configured to sense the current flowing through the first resistor, and configured to output a boost mode triggering signal when the current sensor circuit determines that the current is larger than a current threshold;
- a predicting circuit connected to the current sensor circuit and the battery, and coupled to the common voltage, wherein, when the predicting circuit receives the boost mode triggering signal, the predicting circuit determines that the switching charger needs to enter a turbo boost mode from a buck mode, calculates a target voltage level based on the common voltage and a voltage of the battery, and instantly pulls up or down a voltage level of the error amplified signal to the target voltage level; and
- a comparator, wherein a first input terminal of the comparator is connected to a ramp signal generator, a second input terminal of the comparator is connected to an output terminal of the predicting circuit, and the comparator is configured to receive a ramp signal from the ramp signal generator and compare the error amplified signal with the ramp signal to output a comparison signal;
- wherein, in the turbo boost mode, the controller circuit controls the driver circuit to drive the high-side switch and the low-side switch according to the comparison signal, such that a current of the battery flows to the electronic device sequentially through the inductor and the high-side switch, and the current of the input power source flows to the electronic device through the first resistor, at the same time.

2. The transient response improving system according to claim 1, wherein the switching charger further includes a compensation circuit, the compensation circuit is connected between the predicting circuit and the second input terminal of the comparator, the compensation circuit is connected to the first resistor, a second resistor and the battery, the second resistor is connected between the inductor and the battery, and the compensation circuit is configured to output the error amplified signal according to voltages or currents of one or more of the first resistor, the second resistor and the battery.

3. The transient response improving system according to claim 2, wherein the switching charger further includes a feedback circuit, the compensation circuit is connected to the first resistor, the second resistor and the battery through the feedback circuit, and the feedback circuit is configured to feedback the voltages or currents of one or more of the first resistor, the second resistor and the battery to the compensation circuit.

4. The transient response improving system according to claim 2, wherein the predicting circuit includes a level predicting circuit and a level adjusting circuit, the level predicting circuit is coupled to the common voltage, the level predicting circuit is connected to the battery and the level adjusting circuit, the level adjusting circuit is connected to the current sensor circuit and the compensation circuit, the level predicting circuit calculates the target voltage level according to the common voltage and the voltage of the battery, and when the level adjusting circuit receives the boost mode triggering signal, the level adjusting circuit instantly pulls up or down the voltage level of the error amplified signal to the target voltage level.

5. The transient response improving system according to claim 4, wherein the predicting circuit further includes a period calculating circuit, the level predicting circuit is connected to the common voltage and the battery through the period calculating circuit, the period calculating circuit is configured to divide the voltage of the battery by the common voltage to obtain a first value and then multiply the first value by a period of the ramp signal to calculate an on-time of the high-side switch, and the level predicting circuit predicts the target voltage level according to the on-time of the high-side switch.

6. The transient response improving system according to claim 5, wherein, in the buck mode, after the current flows from the input power source to the first resistor, the current is divided into two sub-currents that respectively flow to the electronic device and the battery, or the current flows to one of the electronic device and the battery.

7. A transient response improving method with a prediction mechanism of an error amplified signal, which is applicable to a switching charger, wherein the switching charger includes a high-side switch, a low-side switch, a driver circuit and a controller circuit, the driver circuit is connected to the controller circuit, a control terminal of the high-side switch and a control terminal of the low-side switch, a first terminal of the high-side switch is coupled to a common voltage, the first terminal of the high-side switch is connected to a first terminal of a first resistor and an electronic device, a second terminal of the first resistor is connected to an input power source, a first terminal of the low-side switch is connected to a second terminal of the high-side switch, a second terminal of the low-side switch is grounded, and a node between the second terminal of the high-side switch and the first terminal of the low-side switch is connected to a battery through an inductor, the transient response improving method with the prediction mechanism of the error amplified signal comprising the following steps:

- supplying a current to the electronic device through the first resistor from the input power source;
- sensing the current flowing through the first resistor;
- determining whether or not the current is larger than a current threshold, in response to determining that the current is not larger than the current threshold, returning to the previous step, and in response to determining that the current is larger than the current threshold, performing the next step;
- calculating a target voltage level according to the common voltage and a voltage of the battery;
- pulling up or down a voltage level of the error amplified signal to the target voltage level instantly;
- comparing the error amplified signal with a ramp signal to output a comparison signal; and
- using the controller circuit to control the driver circuit to drive the high-side switch and the low-side switch according to the comparison signal, such that a current of the battery flows to the electronic device sequentially through the inductor and the high-side switch, and the current of the input power source flows to the electronic device through the first resistor, at the same time.

8. The transient response improving method according to claim 7, further comprising the following steps:
outputting the error amplified signal according to voltages or currents of one or more of the first resistor, the second resistor and the battery, wherein the second resistor is connected between the inductor and the battery; and
pulling up or down the voltage level of the error amplified signal to the target voltage level instantly.

9. The transient response improving method according to claim 8, further comprising the following steps:
dividing the voltage of the battery by the common voltage to obtain a first value and multiplying the first value by a period of the ramp signal to calculate an on-time of the high-side switch; and
predicting the target voltage level according to the on-time of the high-side switch.

\* \* \* \* \*